United States Patent
Whitehead

(10) Patent No.: US 6,952,016 B2
(45) Date of Patent: Oct. 4, 2005

(54) DIAMOND RADIATION DETECTOR

(76) Inventor: Andrew John Whitehead, 60 Cheylesmore Drive, Camberley, Surrey (GB), GU16 9BW ( * ) Notice: Subject to any disclaimer, the term of this patent is extended or adjusted under 35 U.S.C. 154(b) by 30 days.

(21) Appl. No.: 10/221,491

(22) PCT Filed: Mar. 13, 2001

(86) PCT No.: PCT/IB01/00348
§ 371 (c)(1),
(2), (4) Date: Nov. 21, 2002

(87) PCT Pub. No.: WO01/69285
PCT Pub. Date: Sep. 20, 2001

(65) Prior Publication Data
US 2003/0107003 A1 Jun. 12, 2003

(30) Foreign Application Priority Data
Mar. 15, 2000 (GB) .............................................. 0006318

(51) Int. Cl.[7] .............................................. G01T 1/29
(52) U.S. Cl. .............................. 250/370.12; 250/370.11
(58) Field of Search ....................... 250/370.12, 370.01, 250/370.11, 338.4, 336.1, 370.1

(56) References Cited

U.S. PATENT DOCUMENTS

| | | | | |
|---|---|---|---|---|
| 5,173,612 A | * | 12/1992 | Imai et al. | 250/505.1 |
| 5,216,249 A | * | 6/1993 | Jones et al. | 250/370.05 |
| 5,298,749 A | * | 3/1994 | Inushima | 250/338.4 |
| 5,471,947 A | * | 12/1995 | Southworth et al. | 117/94 |
| 5,562,769 A | * | 10/1996 | Dreifus et al. | 117/86 |
| 5,717,214 A | * | 2/1998 | Kitamura et al. | 250/370.1 |
| 6,453,748 B1 | * | 9/2002 | Pryor | 73/727 |
| 6,582,513 B1 | * | 6/2003 | Linares et al. | 117/93 |

FOREIGN PATENT DOCUMENTS

| | | |
|---|---|---|
| EP | 0 479 625 | 4/1992 |
| EP | 0 582 397 | 2/1994 |
| WO | WO97/00456 | 1/1997 |

* cited by examiner

*Primary Examiner*—Otilia Gabor
(74) *Attorney, Agent, or Firm*—Burns, Doane, Swecker & Mathis, LLP

(57) ABSTRACT

A radiation detector comprises a boron-doped diamond substrate (10) having an overlayer (12) of diamond epitaxially grown on surface (14) of the substrate (10). The top surface (16) of the layer (12) is provided with an interdigitated electrode array (18) in electrical contact therewith.

14 Claims, 1 Drawing Sheet

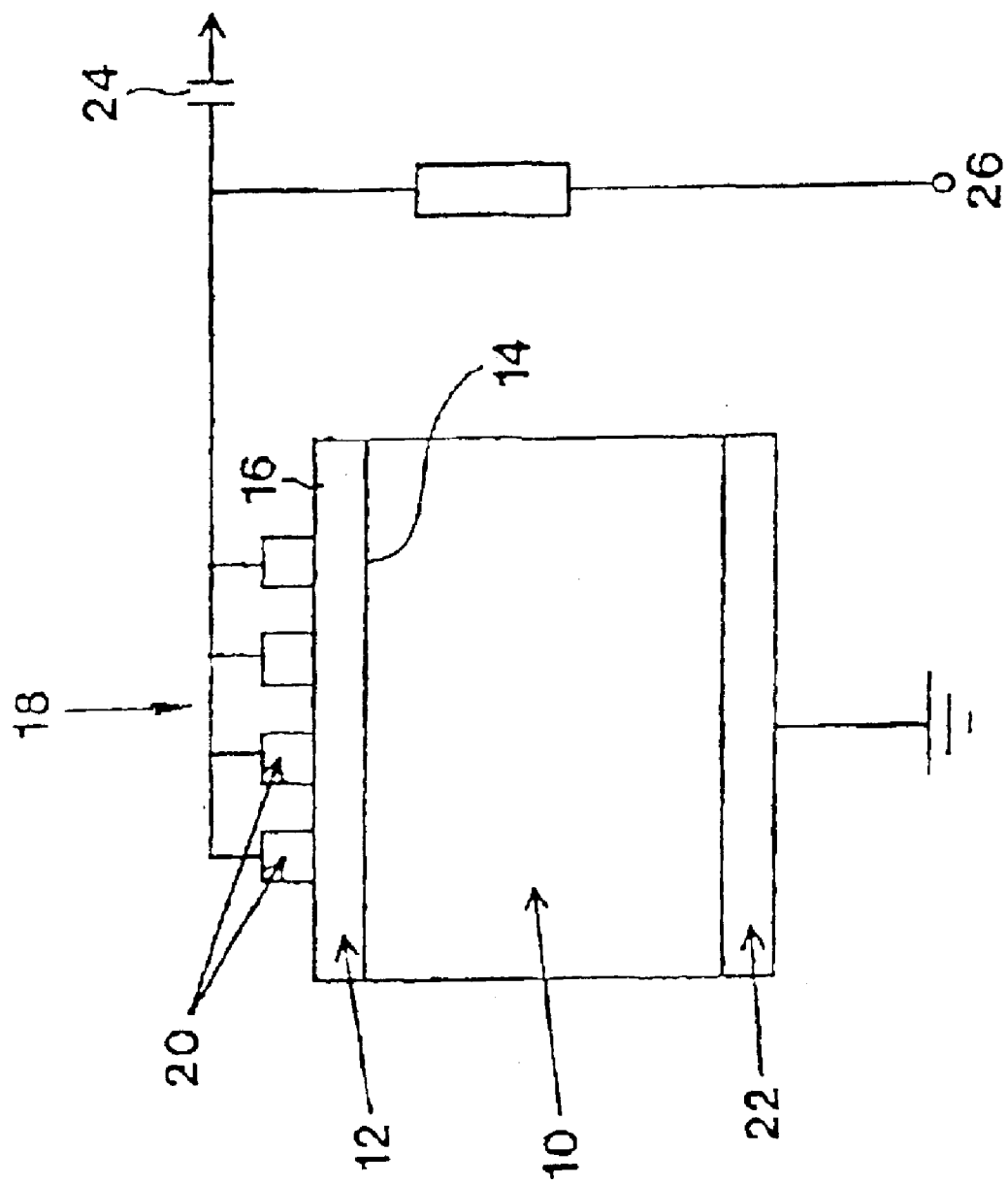

DIAMOND RADIATION DETECTOR

BACKGROUND OF THE INVENTION

This invention relates to a radiation detector.

Diamond can be used to respond electrically to radiation which penetrates only a small distance (eg. less than 10 $\mu$m) into diamond, such as alpha particles and electromagnetic radiation with a wavelength of less than approximately 220 nm, e.g. ultra-violet and soft X-rays. Current diamond detectors for such radiation consist of a thin layer of diamond, generally about 1 to 200 $\mu$m in thickness of as-grown diamond, either free-standing or a non-diamond substrate such as a silicon substrate. Typically, the growth surface of the thin layer will be patterned with an interdigitated electrode array.

Diamond is a wide band gap semiconductor and at room temperature it is, under normal circumstances, an electrical insulator. For a pure diamond to conduct, electrons must be promoted from the normally full valence band to the normally empty conduction band, creating electron-hole (e-h) pairs; this occurs when radiation such as gamma-rays, X-rays, ultra-violet light, alpha particles and beta particles impinges on the diamond. If there is an electric field across the diamond, the carriers will move and a current, the photocurrent, will flow. The size of the photocurrent for a particular diamond will depend on the type and intensity of the radiation and it will flow until the e-h pairs recombine.

The charge carriers which are produced by the radiation are typically collected by the interdigitated electrode array on the growth surface of the layer.

U.S. Pat. No. 5,216,249 describes a neutron detector comprising a layer of polycrystalline diamond material deposited by chemical vapour deposition, the diamond material containing sufficient amounts of $^{10}$B as a dopant to optimise the neutron detection characteristics of the detector,

SUMMARY OF THE INVENTION

According to the present invention, a radiation detector, particularly for radiation such as gamma-rays, X-rays, ultra-violet light, alpha particles and beta particles, comprises an overlayer of diamond grown on a surface of a boron-doped diamond substrate.

The substrate is boron-doped diamond and may be polycrystalline or single crystal in nature. The diamond may be natural or synthetic diamond in which the boron doping is achieved by ion implantation, by introduction into the growth capsule in a high pressure/high temperature synthesis or naturally. The diamond may also be produced by chemical vapour deposition (CVD) in which event the boron doping will generally be achieved during synthesis of the diamond. The boron atoms may be in substitutional or interstitial positions in the diamond lattice. The boron content of the boron-doped diamond will typically be in the range $10^{17}$ to $10^{21}$ boron atoms per cm$^2$.

The boron-doped diamond substrate will typically have a thickness of 0.1 to 2 mm.

The radiation detector has an overlayer of diamond which is produced epitaxially on a surface of the boron-doped diamond substrate. The diamond of the overlayer will have a grain size comparable with that of the substrate. Thus, if the boron-doped diamond of the substrate has a, grain size of 20 to 50 $\mu$m the grain size of the diamond of the overlayer will be 20 to 50 $\mu$m. The thickness of the diamond overlayer will typically be in the range 1 $\mu$M to 500 $\mu$m, preferably in the range 3 $\mu$m to 50 $\mu$m.

The overgrown diamond layer may also preserve some of the crystalline features of the substrate and thus be, for instance, of larger grain size than a layer of the same thickness grown on a non-diamond substrate.

The overgrown diamond will preferably be grown by CVD. Methods of depositing diamond on a substrate by CVD are now well established and have been described extensively in the patent and other literature. Where diamond is being deposited on a substrate, the method generally involves providing a gas mixture which, on dissociation, can provide hydrogen or a halogen (e.g. F, Cl) in atomic form and C or carbon containing radicals and other reactive species, e.g. $CH_x$, $CF_x$ wherein x can be 1 to 4. In addition oxygen containing sources may be present, as may sources for nitrogen, and for boron. In many processes inert gases such as helium, neon or argon are also present. Thus, a typical source gas mixture will contain hydrocarbons $C_xH_y$, wherein x and y can each be 1 to 10, halocarbons $C_xY_yHal_z$ wherein x, y and z can each be 1 to 10, optionally one or more of the following. CO, $CO_2$, $O_2$, $H_2$, $N_2$, $NH_3$, $B_2H_6$, and an inert gas. Each gas may be present in its natural isotopic ratio, or the relative isotopic ratios may be artificially controlled; for example hydrogen may be present as deuterium or tritium, and carbon may be present as $^{12}$C or $^{13}$C. Dissociation of the source gas mixture is brought about by an energy source such as microwaves, lasers, RF energy a flame, or a hot filament, and the reactive gas species so produced are allowed to deposit onto a substrate and form diamond.

In one preferred form of the invention, the surface on which the CVD diamond overlayer is grown is a polished surface. The surface may be polished to a low roughness, for example, an RA (or centre line average) of less than 30 nm. With such a polished surface, the overlayer will have a much lower as-grown roughness than one grown on a rough surface.

In use, the radiation detector will typically include a first electrical contact applied to the overlayer, and a second electrical contact applied to or in, electrical contact with the substrate.

Further according to the invention, a method of detecting or measuring radiation includes the steps of providing a radiation detector of the type described above and exposing a surface of the diamond overlayer to the radiation.

BRIEF DESCRIPTION OF THE DRAWING

The drawing illustrates a schematic view of an embodiment of a radiation detector of the invention.

DESCRIPTION OF EMBODIMENTS

An embodiment of the invention will now be described with reference to the attached drawing which is a schematic view of a radiation detector. Referring to this drawing, a boron-doped CVD diamond substrate 10 has a thin, high quality, overlayer 12 of diamond epitaxially grown using CVD on surface 14 of the substrate 10. The surface 14 may be a polished surface. The boron content of the substrate 10 will typically be in the range $10^{17}$ to $10^{21}$ boron atoms per cm$^2$. The overlayer 12 will have a grain size comparable with that of the substrate.

The top surface 16 of the layer 12 is provided with an interdigitated electrode array 18 in electrical contact therewith. The array 18 comprises a plurality of electrodes 20. A back surface contact 22 is provided on the substrate 10 and is connected to earth. The interdigitated electrode array 16 is connected to a current or charge-measuring system through a suitable isolation circuit (represented schematically in the drawing as a capacitor 24), 26 indicates the bias voltage.

In use radiation to be detected impinges on the thin, high quality layer 12. E-h pairs are produced and these separate under the influence of the external bias voltage. A current is induced in the external circuit which is measured by the current or charge-measuring system. The magnitude of the current/charge gives a measure of the radiation intensity.

In a second embodiment (not illustrated), an interdigitated electron array is fabricated on the surface of the high quality layer 12. One set of electrodes is biased to a voltage of between −1000 V and +1000 V and the second set is connected to earth. In use, radiation to be detected impinges on the thin, high quality layer 12. E-h pairs are produced and these separate under the influence of the external bias voltage. A current is induced in the external circuit which is measured by the current or charge-measuring system. The magnitude of the current/charge gives a measure of the radiation intensity.

The radiation detector described and illustrated has several advantages over prior art diamond detectors. First, the large grain size of the overgrown layer gives better performance. Second, the number of single grains bridging the gap between adjacent electrodes in the interdigitated electrode array is increased. This leads to an increase in the signal amplitude for a given radiation intensity. Third, the substrate, being electrically conductive, can be used as the back electrode. Fourth, the defect density in the overgrown layer is lower due to the large grain size of that layer. Fifth, the detector is considerably more robust.

The invention is further illustrated by the following example.

EXAMPLE

A boron-doped diamond layer with dimensions 4.5×4.5× 0.8 mm and a measured surface roughness, $R_a$, of less than 30 nm was shown by SIMS to contain a uniform distribution of boron at a level of $10^{19}$ atoms/cm$^3$. This was used as a substrate for the overgrowth, by means of CVD, of a high purity diamond layer with thickness 80 $\mu$m. The substrate, with overgrown diamond layer, was processed to produce a product with a thin high quality layer with thickness 100 $\mu$m and $R_a$<30 nm on top of the boron-doped substrate. SIMS profiling showed that no boron could be detected on the high purity side of the interface. The final dimensions of the product were 4.5×4.5×0.81 mm. The structure was found to be useful as a radiation detector in an arrangement as illustrated by FIG. 1.

What is claimed is:

1. A radiation detector comprises an overlayer of diamond grown on a surface of a boron-doped diamond substrate, wherein the overlayer of diamond is produced expitaxially on the surface of the boron-doped diamond substrate.

2. A radiation detector according to claim 1 wherein the boron-doped diamond is polycrystalline or single crystal in nature.

3. A radiation detector according to claim 1 wherein the boron-doped diamond is CVD diamond.

4. A radiation detector according to claim 1 wherein the boron content of the boron-doped diamond is in the range $10^{17}$ to $10^{21}$ boron atoms per cm$^3$.

5. A radiation detector according to claim 1 wherein the diamond of the overlayer has a grain size comparable with that of the substrate.

6. A method according to claim 1 wherein the boron-doped diamond of the substrate has a grain size of 20 to 50 $\mu$m, and the diamond of the overlayer has a grain size of 20 to 50 $\mu$m.

7. A radiation detector according to claim 1 wherein the boron-doped diamond substrate has a thickness of 0.1 to 2 mm.

8. A radiation detector according to claim 1 wherein the thickness of the diamond overlayer is 1 $\mu$m to 50 $\mu$m.

9. A radiation detector according to claim 1 wherein the thickness of the diamond overlayer is 3 to 50 $\mu$m.

10. A radiation detector according to claim 1 wherein the diamond of the overgrown layer is grown by a CVD.

11. A radiation detector according to claim 10 wherein the CVD diamond overlayer is grown on a polished surface.

12. A radiation detector according to claim 11 wherein the polished surface has an ERA of less than 30 nm.

13. A method of detecting or measuring radiation includes the steps of providing a diamond detector comprised of an overlayer of diamond grown expitaxially on a surface of a boron-doped diamond substrate and exposing a surface of the overlayer to the radiation.

14. A method according to claim 13, wherein the detector is used in detecting radiation selected from gamma rays, X-rays, ultra-violet light, alpha particles and beta particles.

* * * * *